United States Patent [19]
Shimaya

[11] Patent Number: 5,419,742
[45] Date of Patent: May 30, 1995

[54] ROTATING RING GUIDE SHOE OR TENSIONER

[75] Inventor: Kazuhiko Shimaya, Hidaka, Japan

[73] Assignee: Tsubakimoto Chain Co., Osaka, Japan

[21] Appl. No.: 258,098

[22] Filed: Jun. 10, 1994

Related U.S. Application Data

[62] Division of Ser. No. 73,750, Jun. 8, 1993, Pat. No. 5,366,417.

Foreign Application Priority Data

Jun. 18, 1992 [JP] Japan .................................. 4-48238

[51] Int. Cl.⁶ ........................... F16H 7/10; F16H 7/18
[52] U.S. Cl. ................... 474/112; 474/131; 474/139; 474/197; 474/198
[58] Field of Search ........ 474/101, 112, 131, 133–135, 474/139, 197, 198

[56] References Cited

U.S. PATENT DOCUMENTS

| | | | |
|---|---|---|---|
| 366,600 | 7/1887 | Norgrave | 474/112 |
| 525,694 | 9/1894 | Cruser | 474/112 X |
| 1,188,316 | 6/1916 | Pierce | 474/112 |
| 1,393,990 | 10/1921 | Ford | 474/112 |
| 1,467,591 | 9/1923 | Riker | 474/112 |
| 1,913,872 | 6/1933 | Dow | 474/112 |
| 2,675,709 | 4/1954 | Dowdy | 474/112 X |
| 4,923,435 | 5/1990 | Kadota et al. | 474/112 |

*Primary Examiner*—Roger J. Schoeppel
*Attorney, Agent, or Firm*—Howson & Howson

[57] ABSTRACT

A vibration proofing system for an engine timing chain utilizes a tensioner on the slack side of the chain path, in which a ring-shaped, chain-engaging shoe is rotatably disposed on a circular frame mounted on the piston of a tensioner mechanism, and in which the shoe surrounds the frame and tensioner mechanism. Engine oil, which is used in the tensioner, is supplied from the tensioner to lubricate the rotatable chain-engaging shoe. On the tension side of the chain path, a guide includes fixed support, a first ring rotatable on the support, and a ring-shaped, chain-engaging shoe which is in off-centered relationship to the support and the inner diameter of which is larger than the outer diameter of the first ring. Engine oil is supplied through the support to lubricate the first ring.

3 Claims, 4 Drawing Sheets

ROTATING RING GUIDE SHOE OR TENSIONER

CROSS REFERENCE TO RELATED APPLICATION

This is a division of my application Ser. No. 073,750, filed Jun. 8, 1993 now U.S. Pat. No. 5,366,417.

BRIEF SUMMARY OF THE INVENTION

This invention relates generally to mechanical power transmission using an endless, flexible, circulating element such as a chain, a belt or the like, and more specifically to an improvement for preventing vibration of the endless, flexible, circulating element.

In conventional vibration-proofing mechanisms, especially in the case of a chain for transmitting torque from an engine crankshaft to one or more camshafts, various tensioners and guides have been used.

One form of conventional vibration-proofing mechanism utilizes guides and tensioners against which the chain slides. This type of vibration-proofing mechanism has the disadvantage that the guides and chain-engaging tensioner shoes, as well as the chain, are subject to damage, cannot withstand long-term use, and produce frictional heat and noise.

Another form of vibration-proofing mechanism utilizes chain-engaging sprockets as well as guides against which the chain slides. The sprockets, which can include a sprocket associated with a tensioner as well as an idler sprocket, are generally of small diameter, and the bending of the chain around these small-diameter sprockets produces engagement sounds. Furthermore, the bending of the chain around the small-diameter sprockets causes the chain to vibrate.

An important object of this invention is to provide an improved vibration-proofing mechanism for a mechanical power transmission using a chain or other endless, flexible, circulating means, in which the likelihood and frequency of damage to the parts is reduced. Another object of the invention is to improve the useful life of the chain and other parts in such a device. Still another object is to reduce friction and frictionally produced heat. Still another object of the invention is to reduce noise produced in a chain drive. Still another object of the invention is to reduce the intensity of engagement sounds in a chain drive. A still further object of the invention is to provide improved resistance to vibration.

This invention addresses the above-described objects firstly by the provision of a tensioner having a ring-like tensioner shoe, the outer periphery of which contacts with the chain or belt, a support frame for rotatably supporting the ring-like shoe, and a piston for pressing the support frame against the chain. Secondly the invention provides a ring-like guide shoe rotatably supported by a stationary frame, which contacts a portion of the inner periphery of the guide shoe so that a portion of the outer periphery of the guide shoe contacts the chain.

More particularly, in a preferred embodiment, the invention resides in a mechanical power transmission comprising an endless, flexible, circulating power transmission means for transmitting rotating power from at least one rotating shaft to at least one other rotating shaft, and a tensioner. The tensioner comprises a ring-shaped tensioner shoe having an outer periphery in contact with the endless, flexible means, means providing a support frame for rotatably supporting the ring-shaped tensioner shoe, and piston means for urging the support frame in a direction such that the ring-shaped tensioner shoe is pressed against the endless, flexible means to apply tension thereto.

Preferably, the support frame and the piston means are mounted within the ring-shaped tensioner shoe so that they are surrounded by the tensioner shoe.

Another preferred embodiment of the mechanical power transmission comprises a guide for the flexible means. The guide comprises a ring-shaped guide shoe having an outer periphery and an inner periphery, and having a portion of its outer periphery in contact with the endless, flexible means, and means providing a stationary frame for rotatably supporting the guide shoe. The frame is in contact with the guide shoe over a part of the inner periphery of the guide shoe directly opposite to said portion of its outer periphery.

Preferably the stationary frame has an outer periphery which is circular in shape, and the guide shoe is in off-centered relationship to the frame.

The tensioner in accordance with the invention presses a tensioner shoe by means of a piston against a chain, belt or other endless, flexible, circulating power transmission to impart a proper tension. The tensioner shoe rotates on a support frame, in response to the circulating movement of the endless, flexible, circulating power transmitting means. Therefore, there is little, if any, relative sliding between the tensioner shoe and the endless, flexible means.

In the guide, the guide shoe is in contact with the flexible means, applying tension to the flexible means and preventing slack from occurring. The guide shoe rotates on its stationary frame in response to the circulating movement of the flexible means. Therefore, there is little, if any, relative sliding between the guide shoe and the flexible means.

Further objects, advantages and details of the invention will be apparent from the following detailed description, when read in conjunction with the drawings.

DETAILED DESCRIPTION

Figure 6:
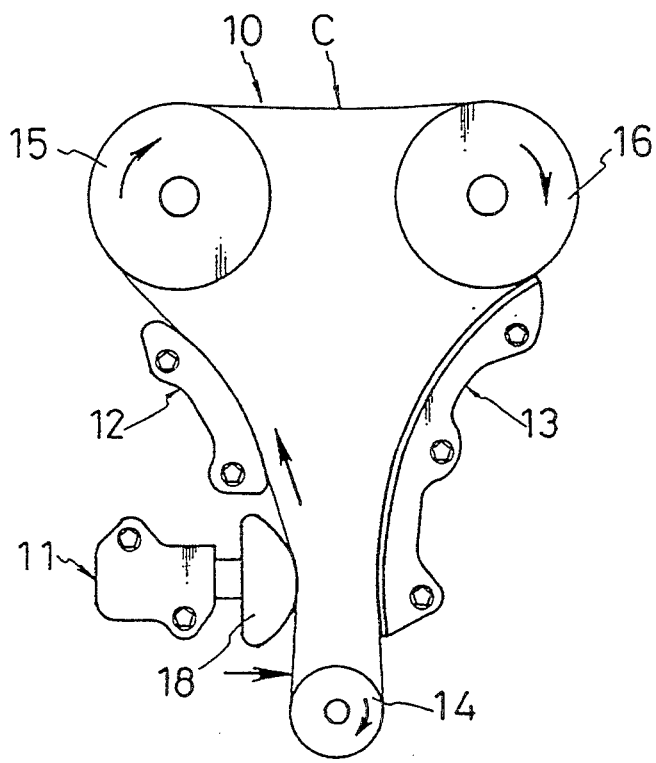
FIG. 6 is a schematic elevational view of a vibration-proofing mechanism of the prior art.
Figure 7:
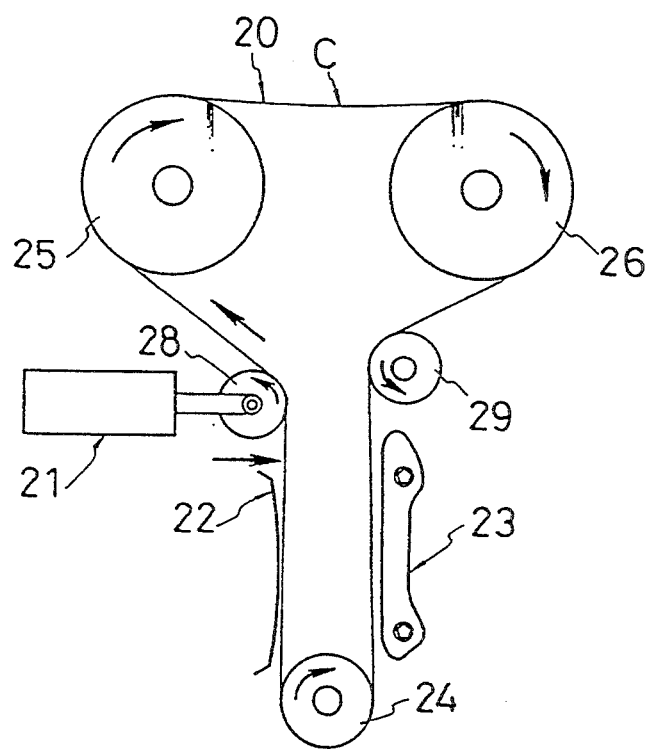
FIG. 7 is a schematic elevational view of another vibration-proofing mechanism of the prior art.

Referring first to the prior art, FIGS. 6 and 7 show conventional vibration-proofing mechanisms 10 and 20 respectively, for preventing vibration of a chain which transmits torque from an engine crankshaft to the engine camshafts.

The vibration-proofing mechanism 10, shown in FIG. 6, is composed of a tensioner 11, a bowed slack guide 12, and a tension guide 13.

The tensioner 11 presses a shoe 18, having a chain-engaging face in the form of a circular arc, against a chain C mounted on sprockets 14, 15 and 16. The tensioner constantly imparts a proper tension to chain C to preventing vibration of the chain. The slack guide 12, which is situated in contact with the portion of chain C moving from the crankshaft sprocket 14 toward camshaft sprocket 15, guides the movement of the chain to provide the chain with tension. The tension guide 13, situated in contact with the portion of chain C moving from camshaft sprocket 16 toward the crankshaft sprocket 14, guides the circulating movement of the chain.

The vibration-proofing mechanism 20, shown in FIG. 7, consists of a tensioner 21, a slack guide 22, a tension guide 23, and an idler sprocket 29.

The tensioner 21 presses a sprocket 28 against chain C, which is mounted on sprockets 24, 25 and 26. Thus, the tensioner constantly applies a proper tension to the chain, and thereby prevents vibration of the chain. The slack guide 22, located between crankshaft sprocket 24 and tensioner sprocket 28, guides the movement of the chain to provide the chain with tension. The tension guide 23 and idler sprocket 29 guide the circulating movement of the chain C.

The vibration-proofing mechanism 10, shown in FIG. 6, is of a design such that chain C will slide on the slack guide 12, tension guide 13 and shoe 18. Therefore, the mechanism 10 has the disadvantage that the slack guide 12, the tension guide 13, shoe 18 and chain C are subject to damage, cannot withstand long-term use, and produce both frictional heat and noise.

The vibration-proofing mechanism 20, shown in FIG. 7 has the problem that chain C, being engaged with and bent around small-diameter sprockets 28 and 29, produces engagement noise. Furthermore, the bending of the chain C around these sprockets causes the chain to vibrate.

The tensioner and guide according to this invention are both shown in FIG. 1 and will be explained with reference to FIGS. 1 to 5.

Figure 1:
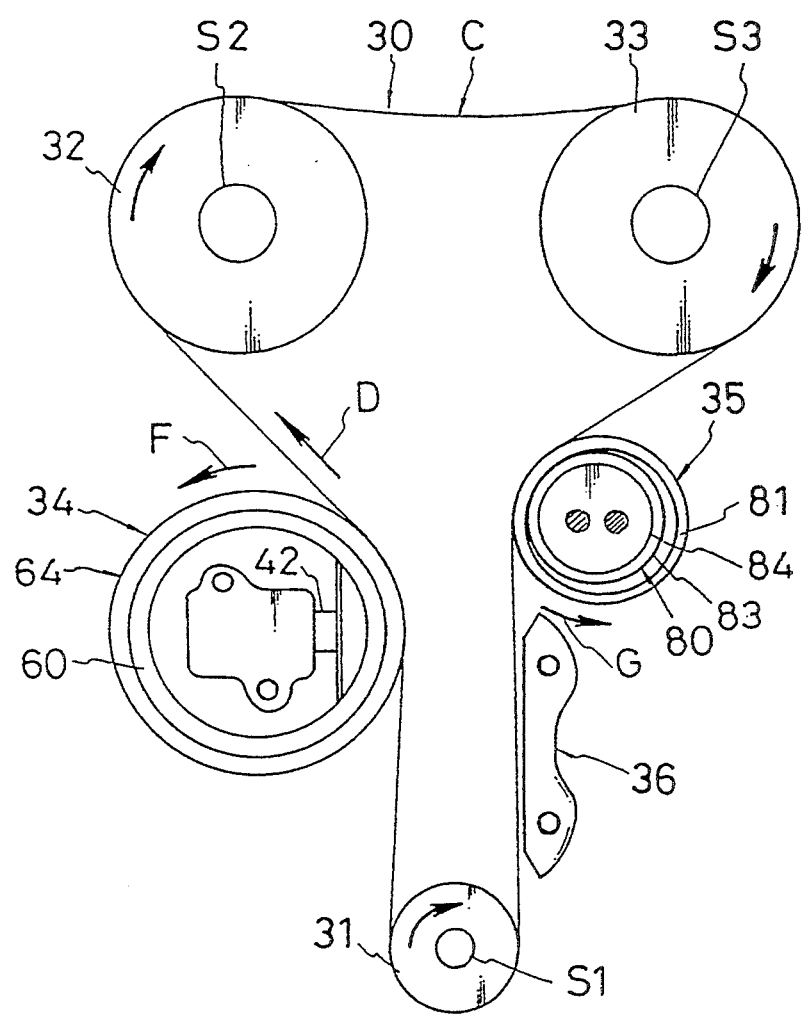
FIG. 1 is a schematic elevational view of a vibration-proofing mechanism comprising a tensioner and a chain guide in accordance with the invention.

FIG. 1 shows a vibration-proofing mechanism 30 for preventing vibration of a chain C which transmits torque of an engine crankshaft S1 to a pair of camshafts S2 and S3. The chain C is mounted on, and engaged with, three sprockets 31, 32 and 33.

The vibration-proofing mechanism 30 comprises a chain tensioner 34 (hereinafter termed only the "tensioner"), and chain guides 35 and 36.

Figure 2:
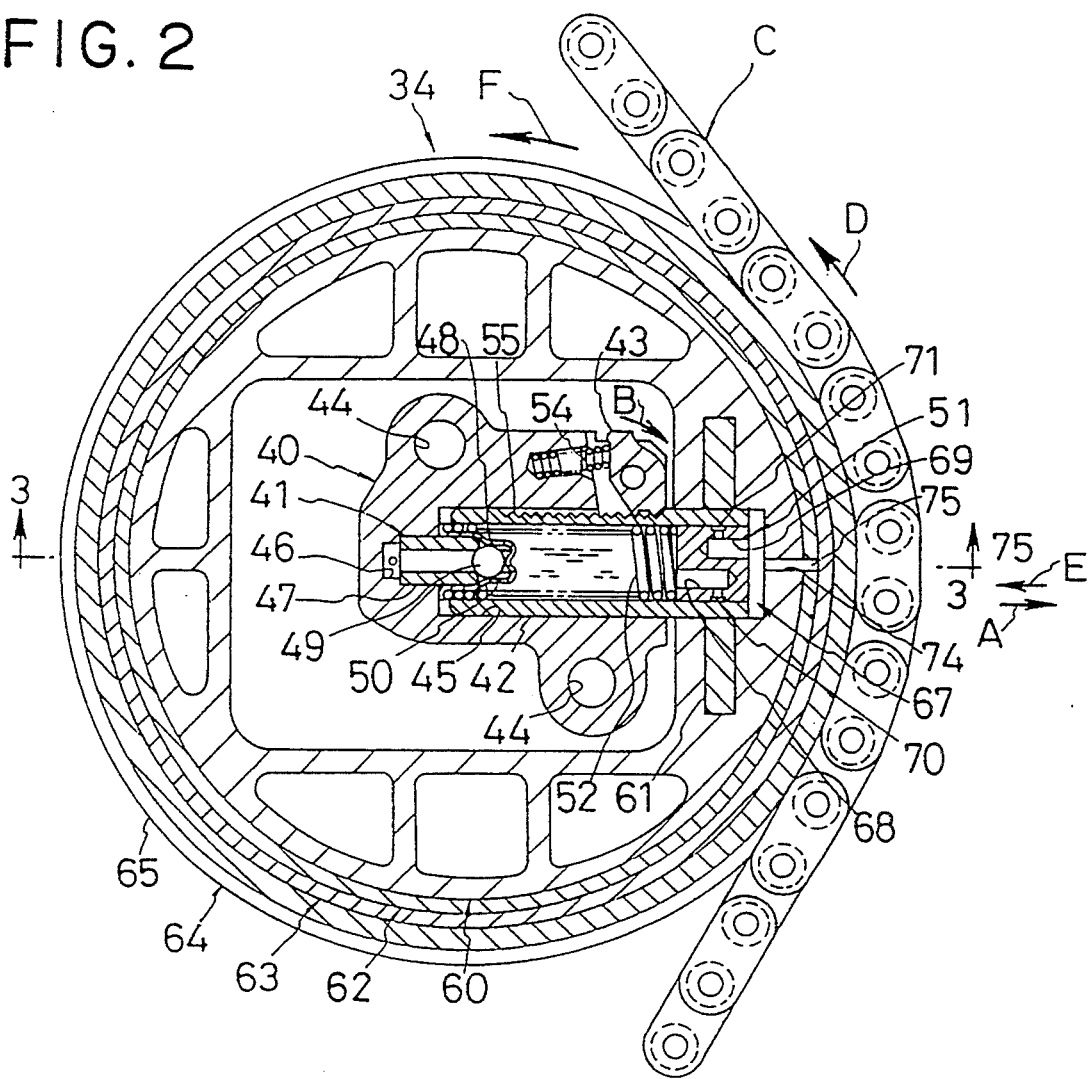
FIG. 2 is a radial section of the tensioner of the invention, taken on surface 2—2 in FIG. 3.
Figure 3:
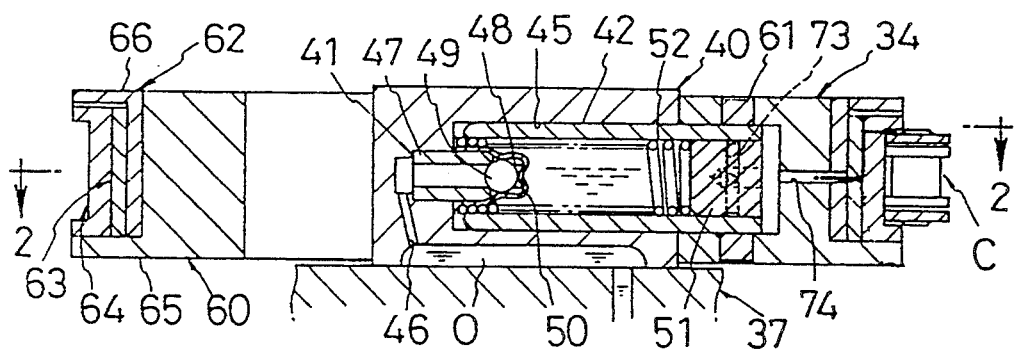
FIG. 3 is an axial section taken on plane 3—3 in FIG. 2.

The tensioner 34, shown in detail in FIGS. 2 and 3, is mounted on the wall of an engine block 37 and constantly imparts proper tension to the chain C.

The tensioner 34 is composed primarily of a housing 40, a check valve 41, a hollow piston 42, a pawl 43 for preventing retracting movement of the piston, a support frame 60, and a tensioner shoe 64.

The housing 40 is provided with mounting holes 44, and is mounted on an engine block 37. A cylinder 45 is formed in housing 44 for guiding the inward and outward movement of the piston 42, and an oil passage 46 is provided for supplying oil to the cylinder. The oil can be engine lubricating oil.

The check valve 41 allows flow of the oil O from the engine block 37 into cylinder 45 and hollow piston 42, but prevents backward flow of the oil.

The check valve 41 includes a cylindrical valve seat 47 press fit in the housing 40 and connected to the oil passage 46. A ball 49 is urged against the valve seat 47 by a spring 48, and a retainer 50 is provided for retaining spring 48 and ball 49.

The piston 42 is cylindrical and has an oil passage cap 51 press fit in its forward end.

A spring 52 is installed within piston 42 for urging the piston 42 in the direction of arrow A.

The pawl 43, which is provided for preventing retracting movement of the piston, is rotatably pivoted on housing 40, and urged by a spring 54 in the clockwise direction indicated by arrow B. The forward end of the pawl 43 is bifurcated, so that either one of the bifurcated parts is engageable with a rack 55 formed on the outer periphery of piston 42. The bifurcation of the pawl makes it possible to achieve a very fine pitch ratcheting action even though the pitch of rack 55 is relatively coarse.

On the forward end of the piston 42, a support frame 60 is attached by a plate 61. The support frame has a circular outer periphery.

A collar 62 is press fit on the outer periphery of the support frame 60. A ring-shaped tensioner shoe 64 has a ring 63 of suitable metal bearing material press fit into its inner periphery. Shoe 64, with its metal ring 63, fits loosely on the outer periphery of collar 62.

The tensioner shoe 64 is U-shaped in cross section, and is supported by, and rotatable on the outer periphery of, the support frame 60. Oil O is automatically applied between metal ring 63 and collar 62 to insure smooth rotation of the tensioner shoe 64.

The oil O is supplied through an oil passage generally indicated by reference numeral 67. The oil passage allows for flow of oil from the inside of piston 42 to the outer periphery of collar 62.

The oil passage 67 comprises two blind holes 68 and 69 formed in oil passage cap 51, leakage holes 70 and 71 communicating with the blind holes 68 and 69 respectively, a groove 73 formed in the outer periphery of the oil passage cap 51 and connecting the two leakage holes 70 and 71, and oil supply holes 74 and 75 formed in support frame 60 and collar 62.

The pressure of the oil O causes it to flow out from inside piston 42 to the outer periphery of collar 62 through blind hole 68, leakage hole 70, groove 73, leakage hole 71, the other blind hole 69, and oil supply holes 74 and 75.

In place of metal ring 63, other forms of bearing (not illustrated) can be provided between the collar 62 and tensioner shoe 64 for rotatably supporting the tensioner shoe 64 on support frame 60. Depending on the type of bearing used, it may be unnecessary to provide oil passage 67 to supply oil O to the bearing.

It is not necessary to use the engine oil as the lubricant for the rotating shoe. If the tensioner includes an oil reservoir, which is often the case, the oil supplied to the tensioner from its own reservoir can be used to lubricate the shoe 64.

In the operation of the tensioner of FIGS. 2 and 3, the shoe 64 is urged against chain C both by pressure of the oil O and by the force exerted by spring 52.

If the chain C sways in the direction of arrow A while circulating in the direction of arrow D, piston 42 protrudes from housing 40 in the direction of arrow A as a result of oil pressure and spring force.

As piston 42 moves outwardly from its housing, ball 49 of check valve 41 moves away from seat 47 against the force of the spring 48, to allow oil O to flow into cylinder 45 and into the interior of piston 42. The oil that has flowed into cylinder 45 is prevented by the check valve from flowing back toward engine block 37. During the projecting movement of piston 42, pawl 43 is also engaged with successive teeth of rack 55. Accordingly, after moving in the projecting direction indicated by arrow A, the piston 42 is held in its projected condition both by check valve 41 and by pawl 43, so that slack in chain C is eliminated.

As chain C tends to sway in the opposite direction, i.e. in the direction of arrow E, the piston 42 is pushed inwardly. However, pawl 43 will bite into rack 55, and the ball 49 of the check valve 41 is urged against valve seat 47 by the pressure of oil in cylinder 45, thereby checking the outward flow of oil through passage 46. Thus, piston 42 is not allowed to move in the direction of arrow E and prevents the chain C from swaying in the direction of the arrow E.

Because the tensioner takes up slack in the chain as it sways in the direction of arrow A, and prevents swaying in the direction of arrow E, vibration of the chain C is prevented.

While the chain C is prevented from vibrating and is circulating in the direction of the arrow D, the tensioner shoe 64, being in contact with chain C, rotates in the direction of the arrow F on support frame 60. Since the shoe 64 rotates with the chain, sliding friction between the tensioner shoe and the chain is minimized.

The tensioner shoe 64 is supported by flange 65 on frame 60 and by flange 66 on collar 62, so that it will not fall away from the support frame during rotation.

The tensioner shoe 64 can rotate smoothly because the oil O is automatically supplied from the tensioner to the interface between metal ring 63 and collar 62.

If the quantity of oil O in the tensioner decreases as it flows out between the metal ring 63 and the collar 62, the piston 42 will not be pushed back by chain C into housing 40, because engagement between rack 55 and pawl 43 prevents backward movement of the piston.

Oil in the tensioner is replenished automatically as a result of the engine oil pressure. Therefore, at least in the case in which engine oil is used to supply the tensioner, oil starvation between metal ring 63 and collar 62 is prevented.

Since the tensioner shoe 64 surrounds the support frame and the support frame 60 and piston 42 are disposed inside the shoe, it is possible to make the most of the mounting space for the tensioner and to make the outside diameter of the tensioner shoe very large. With a large tensioner shoe, the angle of bend of the chain can be kept small. This insures that the tensioner shoe 64 will not interfere with the smooth circulating movement of the chain and cause chain elongation.

Since the outside diameter of the tensioner shoe 64 can made large, it is possible to provide sprocket teeth (not illustrated) on the outer periphery of the tensioner shoe 64 to engage the chain. In the case of a toothed, rotating shoe, again the angle of bend of the chain is small because of the large diameter of the shoe, and engagement sounds are reduced in comparison with those produced by prior art tensioners such as tensioner 21, shown in FIG. 7.

Figure 4:
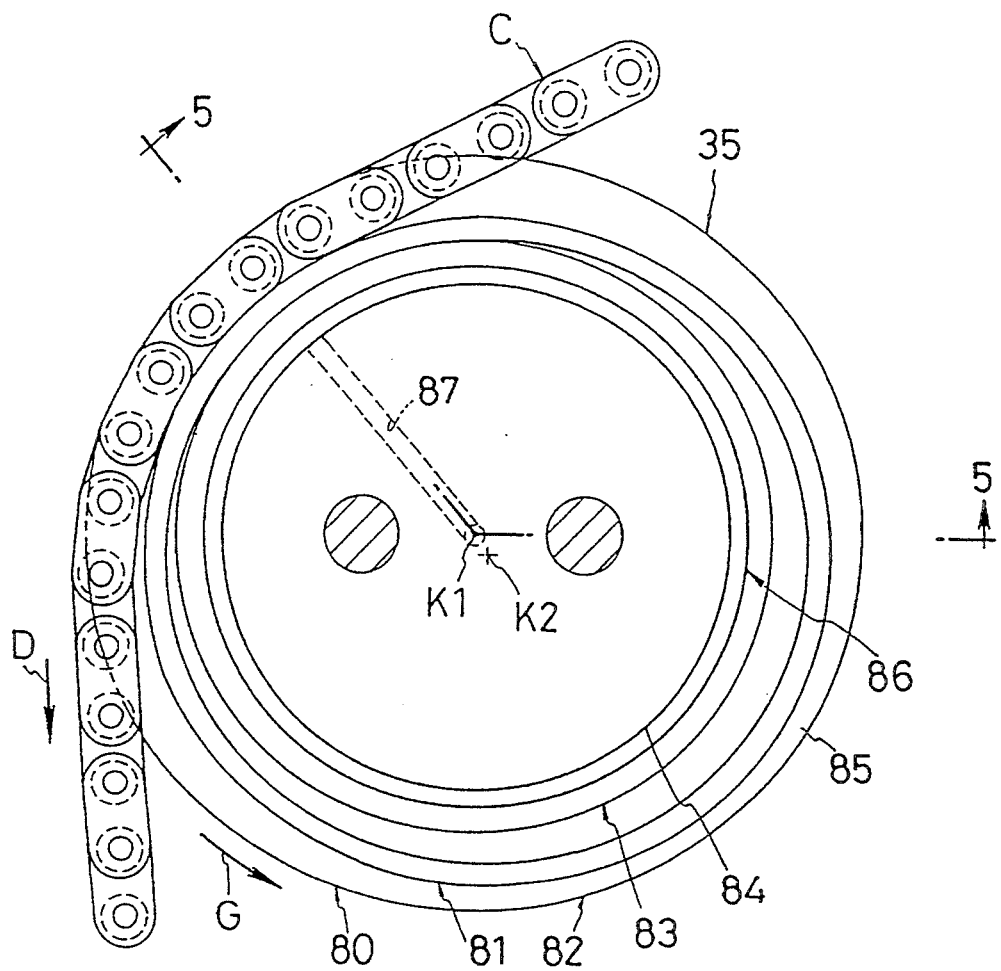
FIG. 4 is a radial section of a chain guide in accordance with the invention, taken on plane 4—4 in FIG. 5.
Figure 5:
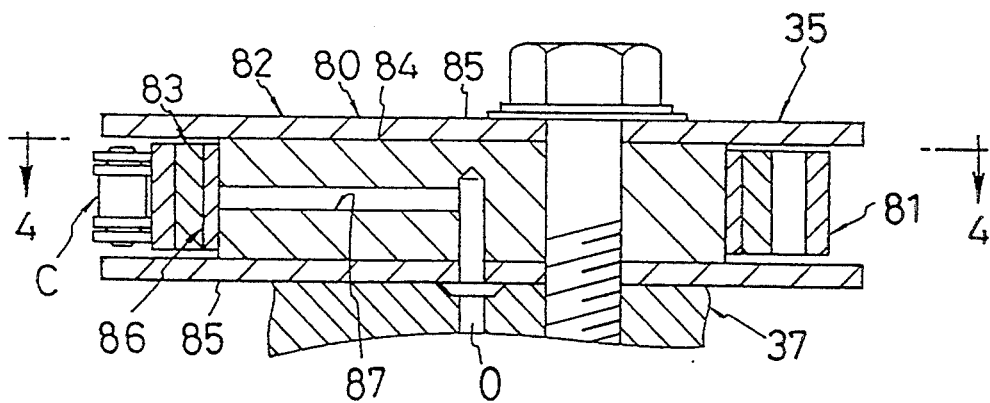
FIG. 5 is an axial section taken on surface 5—5 in FIG. 4.

FIGS. 4 and 5 illustrate chain guide 35 which guides the circulation movement of chain C on the tension side of the chain path. Guide 35 is also mounted on the wall of the engine block 37, as shown in FIG. 5.

The chain guide 35 is composed primarily of a stationary frame 80 and a guide shoe 81. The stationary frame 80 is composed of a support frame 82 and an outer ring 83. The support frame 82 is mounted on the engine block 37, and consists of a support disc 84 for supporting the guide shoe 81, and guide plates 85 mounted on both sides of this support disc 84 to prevent the guide shoe 81 from becoming disengaged from the disc.

The outer ring 83 fits loosely on the support disc 84, and has a metal ring 86 pressed in on its inner periphery. The support frame 82 is provided with an oil passage 87 for supplying oil O to the interface between the outer periphery of the support frame 82 and the inner periphery of the metal ring 86.

The inside diameter of guide shoe 81 is larger than the outside diameter of the outer ring 83, and is rotatably retained on the outer periphery of the outer ring 83.

Another suitable bearing (not illustrated) may be provided, in place of the metal ring 86, between the support disc 84 of the support frame 82 and the outer ring 83. Depending on the type of bearing used, oil passage 87 may not be needed.

As shown in FIGS. 1, 4 and 5, chain guide 35 is positioned so that guide shoe 81 is pressed against the chain C.

Since the outside diameter of the outer ring 83 is smaller than the inside diameter of the guide shoe 81, a part of the outer periphery of the outer ring 83 is in contact with a part of the inner periphery of guide shoe 81.

As chain C circulates in the direction of arrow D, guide shoe 81 rotates in the direction of arrow G on the outer ring 83, or on the support frame 82 together with the outer ring 83, guiding the circulation movement of chain C. There is little if any relative sliding movement between the chain and shoe 81.

The guide shoe 81 can rotate smoothly because the oil O provides lubrication at the interface between the metal ring 86 and disc 84.

The center K1 of the support frame 82 (which is also the center of the stationary frame 80) is located between the chain C and the center K2 of the guide shoe 81. Therefore, the guide shoe 81 is in off-centered relationship to the stationary frame 80.

Since the guide shoe 81 is off-centered in relation to the stationary frame 80, it is possible to increase the outside diameter of the shoe and accordingly to decrease the angle of bend of the chain, thus minimizing disturbance to the smooth circulating movement of the chain and reducing noise.

While the vibration-proofing mechanism 30 has been described in the context of a circulating chain, it is possible to take advantage of the features of the invention in a machine utilizing a flexible belt and to prevent belt vibration in a similar manner.

The tensioner and guide described above are designed to rotate with the movement of the chain, and therefore make rolling contact with the chain, thereby preventing wear by abrasion, production of excessive frictional heat, sliding noise, engagement noise and vibration, all of which are inherent problems in prior-art tensioners and guides.

The tensioner and guide in accordance with the invention also extend the useful life of the chain or other endless, flexible power transmission.

By mounting the support frame and the piston of the tensioner within the ring-shaped tensioner shoe, it is possible to utilize a limited mounting space for the tensioner more effectively, and to maximize the diameter of the tensioner shoe.

By increasing the diameter of the tensioner shoe it is possible to decrease the angle of bend of the chain and thereby avoid disturbing the smooth circulation movement of the chain. Furthermore, increasing the diameter of the tensioner shoe reduces noise resulting from the bending of the chain.

By providing a guide shoe which is off-centered in relation to the guide frame, it is possible to minimize the angle of bend of the chain, and thereby ensuring smooth circulating movement and reduced noise.

The invention is applicable not only to engines, but to other machines utilizing chains, belts and other endless, flexible power transmission devices. Various modifications other than those specifically mentioned above can be made without departing from the scope of the invention as defined in the following claims.

I claim:

1. In a mechanical power transmission comprising an endless, flexible power transmission means for transmitting rotating power from at least one rotating shaft to at least one other rotating shaft, a guide for said flexible means comprising:

a ring-shaped guide shoe having an outer periphery and a substantially smooth inner periphery, said outer periphery comprising a first portion in contact with said endless, flexible means, and a second portion out of contact with said endless, flexible means;

means providing a structural support for rotatably supporting said guide shoe, at least a portion of said structural support means being stationary, said support means being in contact with said guide shoe over a part of the inner periphery thereof immediately adjacent to said first portion of its outer periphery, said support means having an outer periphery which is circular in shape, and in which the guide shoe is in off-centered relationship to said support means, and having a gap between the support means and a part of the inner periphery of the guide shoe which is immediately adjacent to said second portion of the outer periphery, and;

friction reducing means between the inner periphery of said guide shoe and said stationary portion of the support means.

2. A mechanical power transmission as claimed in claim 1 in which said guide shoe has an axis of rotation, and said support means further comprises first and second elements, extending transverse to the axis of rotation of the guide shoe, and disposed on opposite sides of the guide shoe, for preventing the guide shoe from moving along its axis of rotation.

3. A mechanical power transmission as claimed in claim 1 in which said support means comprises a stationary support disc having a periphery, and a ring rotatable about the periphery of said stationary support disc and engageable with the inner periphery of said guide shoe, and said friction reducing means comprises a lubricant and means for supplying said lubricant to the periphery of said stationary support disc and said ring, whereby said ring can rotate freely about the stationary support disc.

* * * * *